Nov. 17, 1936.　　　　H. G. TASKER　　　　2,061,177

FILM MAGAZINE

Filed June 27, 1935

INVENTOR.
Homer G. Tasker
BY
ATTORNEY

Patented Nov. 17, 1936

2,061,177

UNITED STATES PATENT OFFICE 2,061,177

FILM MAGAZINE

Homer G. Tasker, Douglaston, N. Y., assignor to United Research Corporation, Long Island City, N. Y., a corporation of Delaware Application June 27, 1935, Serial No. 28,666

7 Claims. (Cl. 242—71)

This invention relates to motion picture film magazines, and particularly to the type used in sound recording apparatus. It is essential, in sound recorders, that the film pass the point of sound impression at a constant and unvarying speed. Any change in speed, even the slightest amount, will cause distortion of the sound reproduced.

It has been found that one of the causes of variation in speed of the film as it passes through the recorder is in the take-up compartment of the film magazine. When the film is drawn on to the take-up roll it has a tendency to weave sideways, the various turns striking one or both sides of the magazine. Each time the film touches the side of the magazine it introduces friction which causes an uneven pull of the film. This uneven pull of the film may be transmitted through the film itself to that portion of it which is passing the sound gate, or it may be transmitted through the take-up driving mechanism to the film drive sprockets. Although attempts have been made to minimize this uneven friction between the film and the sides of the magazine, such as by forming raised radial flanges on the sides or by providing strips of corduroy or felt against which the film is guided, none have been entirely successful in eliminating it.

One object of the invention is to prevent changes in the speed of the film as it passes the sound gate of a sound recording apparatus.

Another object of the invention is to eliminate the load fluctuations caused by film weave on the take-up reel.

A further object of the invention is to prevent friction between the moving film and stationary elements.

Considered in its broadest aspects, the invention consists of a take-up spindle mounted in anti-friction bearings and has a guide flange attached to one end thereof. A second guide flange similar to the first is mounted upon an anti-friction bearing provided upon the film magazine cover and is in axial alignment with the take-up spindle. Thus it will be seen that friction between the edges of the film and the sides of the magazine will be prevented thereby eliminating any uneven pull of the film in the take-up reel. This will permit the use of a lighter driving motor.

For further details of the invention reference may be had to the accompanying illustrations wherein.

Figure 1:
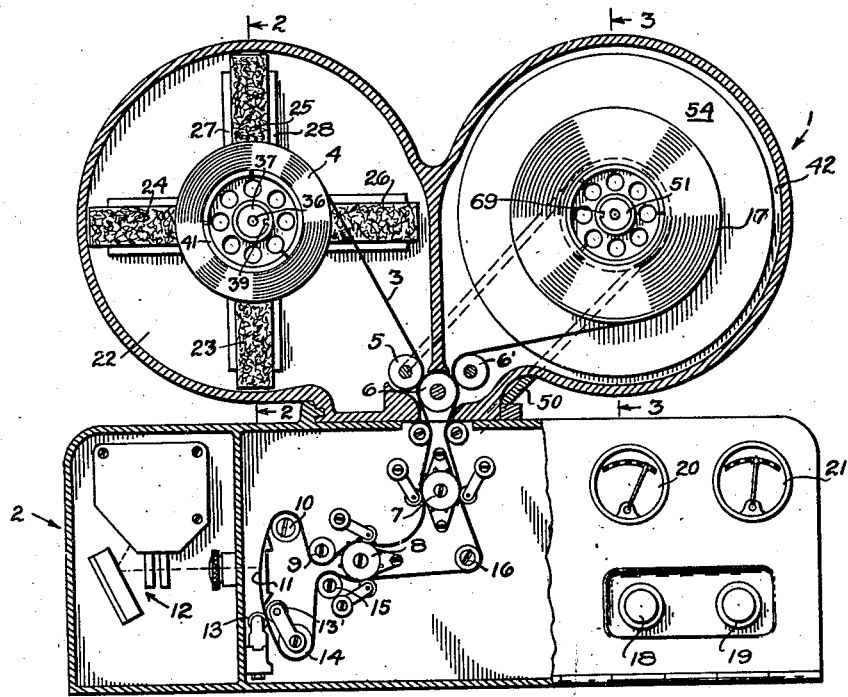
Fig. 1 is an elevational view, partly in section, of a sound recorder employing the preferred form of film magazine.

Referring now to Fig. 1, the film magazine generally indicated at 1, is mounted on a conventional sound recorder 2. Film 3 is led from a supply roll 4, through a pair of rollers 5 and 6 comprising a light trap to prevent entrance of light into the compartment from below in case the door of the recorder is accidentally opened while there is still raw film within the magazine. From the rollers 5 and 6 the film is drawn onto one side of a sprocket 7, thence over a drive sprocket 8, over a pair of rollers 9 and 10 and down past a sound gate 11 where a light beam of varying width is projected thereon by a suitable light modulating apparatus generally indicated at 12. From the sound gate 11 the film travels between a flywheel roller 13 and a spring pressed roller 13', over rollers 14 and 15, and thence under the sprocket 8, over roller 16, past the rear side of the sprocket 7 and through rollers 6 and 6' comprising one side of the magazine light trap from where it is drawn onto the take-up roll 17. Suitable controls 18 and 19 associated with meters 20 and 21 are provided to control the various apparatus within the recorder.

Figure 2:
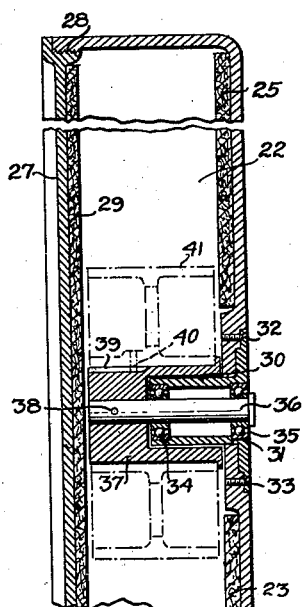
Fig. 2 is a sectional view through the supply roll compartment of the film magazine and is taken along line 2—2 of Fig. 1.

Referring now to Figs. 1 and 2, the supply roll compartment 22 is lined with strips 23, 24, 25 and 26 of felt or corduroy material. Bosses 27 and 28 are provided on either side of the strips 23, 24, 25 and 26 to align and hold the strips in position. A magazine cover 27 is threadably mounted as at 28 (Fig. 2) to the front of the compartment 22 and also has a felt strip 29 attached thereto. A hollow hub portion 30 is mounted within a central aperture 31 provided at the back of the compartment 22 and is secured thereto by screws 32 and 33. A pair of ball-bearings 34 and 35 mounted within the hollow hub 30 carry a rotatable axle 36 which has a hub 37 attached thereto as by a pin 38. A longitudinal groove 39 is provided on the hub 37 and is adapted to be engaged by a projection 40 provided on a film spool 41. The spool 41 is split at one or more places on its outer edge to secure the end of the film therein.

Figure 3:
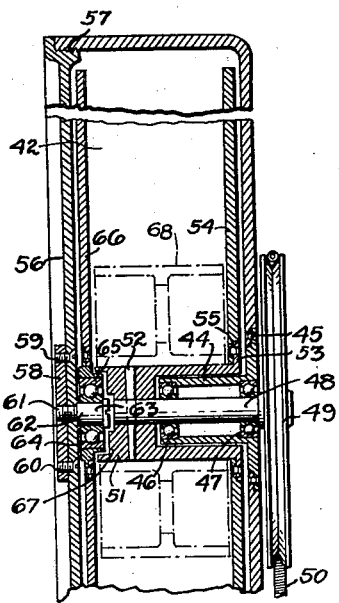
Fig. 3 is a sectional view through the take-up roll compartment of the film magazine and is taken along the line 3—3 of Fig. 1.

Referring now to Fig. 3, the take-up compartment 42 has a hollow hub portion 44 secured to the central portion of the compartment 42 as by rivets 45 and carries a pair of ball bearings 46 and 47. The bearings 46 and 47 carry an axle 48 which has a V-shaped pulley 49 attached to its outer end, adapted to be driven by a transmission belt 50. The belt 50 is driven by a motor pulley (not shown) and is sufficiently loose to permit slippage to allow the take-up roll 16 to go slower as its diameter increases.

The inner end of the shaft 48 is provided with a hub or sleeve 51, which is secured thereto by a pin 52. The hub 51 has a flange 53 on its rear end and has a disc 54 mounted thereto as by rivets 55 to form a guide flange for the film.

A cover 56 is threadably mounted in the take-up compartment 42 as at 57 and has a small plate 58 attached in the center thereof by screws 59 and 60 to provide an increased bearing portion for the screw threaded portion 61 of a short bolt 62. An enlarged bearing portion 63 of the bolt 62 carries a ball bearing 64, the outer race 65 of which has mounted thereon a flange 66 similar in size to the disc 54. The hub 51 is counterbored as at 67 to receive the extending portion of the ball bearing 64.

A film spool 68 is securely mounted to the hub 51 as by a key and slot arrangement 69 (Fig. 1) and carries the take-up roll 17. If the film weaves as it is wound on spool 68, one edge will contact the moving disc 54 with obviously no deleterious effect. The other edge will contact the disc 66 which will move with the film thereby eliminating friction to a negligible degree since the disc 66 is mounted on ball bearings. This type of take-up reel construction is particularly desirable in sound recording or reproducing apparatus where fluctuating loads are harmful, although it may be used with any film system since the substantial elimination of film friction is always desirable.

What is claimed is:

1. In a film take-up magazine, a rotatable shaft, a spool attached to said shaft and adapted to receive film thereon, a rotatable guide at one end of said spool, said guide extending beyond the diameter of said spool, and a second rotatable guide at the other end of said spool and adapted to be rotated solely by contact with said film.

2. A film take-up reel comprising a rotatable shaft, a disc mounted near one end of said shaft and adapted to rotate therewith, a spool driven by said shaft and adapted to rotate concentrically therewith, and a second disc at the other end of said spool comparable in size to said first disc and adapted to rotate independently of said rotatable shaft.

3. The combination of a film magazine and take-up reel comprising a cylindrical casing, a rotatable shaft at the center of said casing, a film spool, means for mounting said spool on said shaft, a disc positioned along one side of said casing and adapted to be driven by said shaft, a cover for said casing, a shaft positioned at the center of said cover and a disc comparable in size to said first disc and mounted on said cover shaft, said second disc being adapted to rotate when contact is made with film wound on said spool.

4. In a system for eliminating uneven film pull in a take-up film magazine, the combination of a film spool, a large diameter rotatable disc at one end of said spool concentrically disposed with respect to said spool, and a second disc comparable in size to said first disc at the other end of said spool and adapted to be rotated only when contact is made with film wound on said spool.

5. In a film supply and take-up system for a sound recorder, the combination of a film feed sprocket, said sprocket advancing said film from a supply reel and feeding said film to a take-up reel, a casing for said reels, said casing being divided into separate compartments for said reels, a plurality of strips of flexible material positioned on the sides of said supply reel compartment, and movable guide flanges on either side of said take-up reel in said take-up reel compartment, at least one of said flanges being movable solely by contact therewith of film being wound on said take-up reel.

6. A film take-up reel construction comprising a shaft adapted to be rotated, a film spool mounted on said shaft for winding film thereon and unwinding film therefrom, and rotatable flanges on the sides of said spool, at least one of said flanges being adapted to rotate with said shaft solely upon film contact therewith.

7. A film take-up magazine construction comprising a cylindrical casing, a rotatable shaft mounted on said casing, a film spool mounted on said shaft, a flange at one end of said spool also mounted on said shaft, a cover for said casing, and a rotatable flange mounted on said cover.

HOMER G. TASKER.